May 25, 1954  R. E. WORKMAN  2,679,572
RESILIENT ROLL
Filed Jan. 12, 1952

INVENTOR.
ROBERT E. WORKMAN
BY
ATTORNEY

Patented May 25, 1954

2,679,572

UNITED STATES PATENT OFFICE 2,679,572

RESILIENT ROLL

Robert E. Workman, Kirkwood, Mo., assignor, by mesne assignments, to The Goodyear Tire & Rubber Company, a corporation of Ohio Application January 12, 1952, Serial No. 266,225

7 Claims. (Cl. 219—19)

This invention relates to rolls, particularly to improved construction for rolls having a resilient heated surface.

Rolls of this type may be used for many purposes, such, for example, as in drying operations, heat sealing films of the various heat sealable materials, printing processes in combination with quick-drying inks, temperature control work and many other similar uses.

Heretofore heated rolls have been complicated in construction and very difficult to maintain in operating condition. Also heated rolls having a resilient surface have been inefficient in operation because of the relatively heavy gauge of surface material required to obtain the necessary resilience. This is brought about by the fact that the heating element is necessarily rigid in construction and thus the resilience obtained is dependent upon the surface material alone.

It is therefore an object of this invention to provide a simple construction for rolls having a resilient heated surface.

Another object of this invention is to provide a uniformly heated roll surface that is efficient in operation.

A further object of the invention is to provide an economical construction for resilient heated rolls.

These and other objects will appear hereinafter as the description of certain preferred embodiments of the invention proceeds, the features, arrangements and combinations being clearly pointed out in the specification and in the claims thereunto appended.

Figure 1:
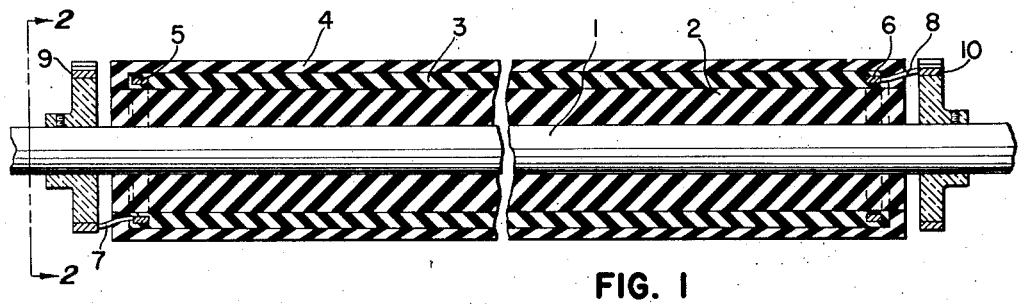
Fig. 1 is a cross-section of a roll embodying the invention.
Figure 2:
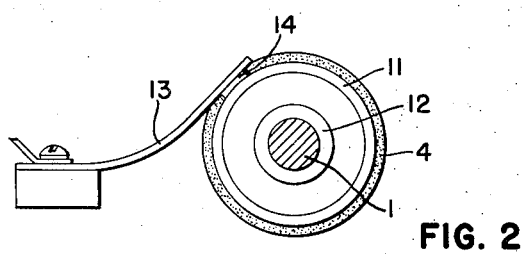
Fig. 2 is a view taken along the line 2—2 of Fig. 1.

In Figs. 1 and 2 the shaft or core 1, supported by any desired means (not shown) and illustrated as a solid member, although any type of supporting member may be used, supports the layer 2 of electrically insulating composition, for example, rubber, either natural or synthetic. Preferably the insulating layer 2 is adhered to the shaft 1 either by bonding or frictional engagement. The heating element is in the form of a layer 3 of electro-conductive plastic composition surrounding the insulating layer 2 and having sufficient resistance to provide the desired heating action when a difference in electrical potential is maintained across the layer. One satisfactory plastic material for the layer 3 is rubber which has conductive carbon black compounded into the rubber, and by varying the composition of the layer 3, the amount of heat generated may be varied between wide limits. The conductive layer 3 is covered with a layer 4 of resilient or deformable composition, preferably rubber, which not only provides a resilient contact surface that will conform to any irregularities brought in contact with the roll surface but also serves as an electrically insulating layer for the conductive layer 3. The desired resilience of the roll surface is provided by the particular composition used to form the layer 4, but inasmuch as the layers 2 and 3 also are resilient, a relatively thin layer 4 may be used in the roll construction to produce the desired resilience at the roll surface. In the preferred form of the invention the entire roll structure is fabricated from unvulcanized materials, then subjected to heat and pressure to vulcanize materials and form an integral structure. The surface of the roll may be ground after vulcanization to provide a contact surface that is symmetrical with the axis of the roll.

In order to supply electrical energy or potential to the conductive layer 3, conductor rings 5 and 6 of brass, copper, etc. are embedded in the conductive layer 3 so that the layer 3 is contacted through its entire periphery at oppositely disposed ends of the conductive layer. Conductor wires 7 and 8 join the rings 5 and 6 respectively to the contact or slip rings 9 and 10 mounted on the shaft 1. The contact rings 9 and 10 as illustrated comprise a band 11 of brass, copper or other suitable conductive material insulated from the shaft 1 by a bushing 12 of insulating material such as Micarta, Bakelite or other similar insulating material. A spring element 13 having a contact point 14 mounted thereon holds the contact point 14 against the band 11 of ring 9 so that continuous contact is maintained between the point 13 and the band 11 as the shaft rotates. A similar spring element maintains a similar contact point against the contact ring 10. The contact points are connected to a suitable source of electrical potential so that a difference of potential is maintained across the conductive layer 3 as the shaft rotates. The resistance of the conductive layer 3 causes heat to be generated uniformly thereover by which the surface of the roll is heated.

Figure 3:
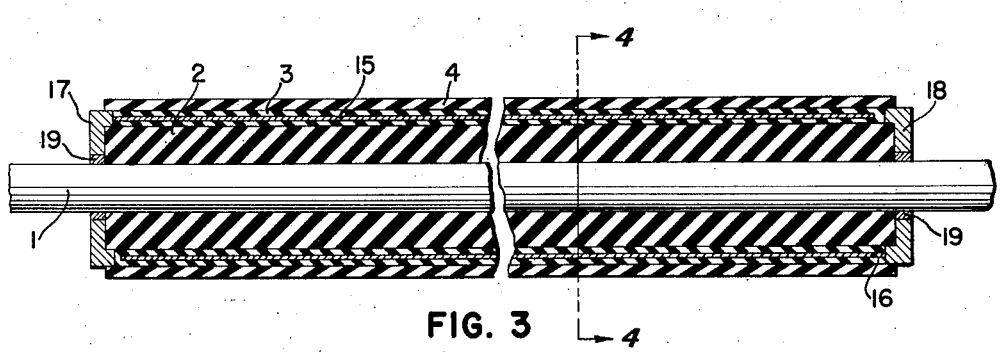
Fig. 3 is a cross-sectional view of a modification of the invention.
Figure 4:
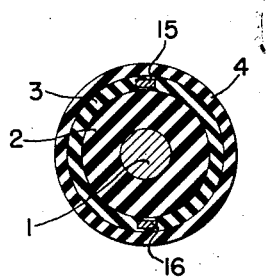
Fig. 4 is a section taken along the line 4—4 of Fig. 3.

In Figs. 3 and 4 is shown a modification of the form of the invention illustrated in Figs. 1 and 2 in which the roll contains the same elements, namely a layer of insulating composition 2, a layer of conductive rubber 3 and a resilient plastic surface layer 4 adhered to shaft 1. In this modification longitudinal conductors 15 and 16 are embedded in the conductive rubber layer 3 and are substantially co-extensive with the layer 3 and extend axially of the roll. A contact ring 17 is attached to the conductor 15 on one end of the roll and contact ring 18 is attached to conductor 16 on the opposite end of the roll. The contact rings 17 and 18 are insulated from the shaft 1 by bushings 19. A spring-pressed contact (not shown) is pressed against the rings 17 and 18 so that when a different electrical potential is maintained between the contacts, the current will flow from one conductor to the other through the conductive layer 3 to heat the layer 3 and consequently the roll surface.

While the conductive layer 3 has been described as being preferably formed of conductive rubber, it is to be understood that this layer may be formed of a fabric sheet treated with conductive rubber. The reference to rubber herein is to be construed as covering natural rubber, synthetic rubber and rubberlike materials.

While certain representative embodiments and details have been shown for the purpose of illustrating the invention, it will be apparent to those skilled in this art that various changes and modifications may be made therein without departing from the spirit or scope of the invention.

Having thus fully described my invention, what I claim and desire to secure by Letters Patent of the United States is:

1. A roll having a resilient heated surface comprising a supporting core member and a body portion surrounding said core member, said body portion including an inner layer of electrically insulating composition adhered to said core member, a layer of electrically conductive plastic composition surrounding said insulating composition, spaced conductors attached to said conductive composition, a source of electrical potential attached to said conductors so that the said conductive layer will generate heat substantially uniformly thereover when a difference in electrical potential is maintained between said conductors and a layer of resilient electrically insulating plastic material covering said layer of conductive composition, all of said layers being bonded together to form an integral structure.

2. A roll having a resilient heated surface comprising a core member and a body portion surrounding said core, said body portion including an inner layer of electrically insulating composition adhered to said core member, a layer of electrically conductive rubber surrounding said insulating composition, spaced conductors attached to said conductive composition, spaced terminal means connected to said conductors, a source of electrical energy attached to said conductors to cause said conductive layer to generate heat substantially uniformly thereover when a difference in electrical potential is maintained between said terminals, and a layer of resilient electrically insulating plastic material covering said layer of conductive composition, all of said layers being bonded together to form an integral structure.

3. A roll for providing a heated deformable surface which comprises a rigid core member and a heating element surrounding and adhered to said core member, said heating element consisting of a layer of electrically conducting rubber, conductors positioned on opposite ends of said conductive layer, terminal means mounted on said core attached to each of said conductors, a source of electrical potential attached to said terminal means to cause the conducting rubber layer to generate heat substantially uniformly thereover when a difference of electrical potential is maintained between said conductors, and inner and outer layers of electrically insulating deformable material enclosing said heating element, the layers of said heating element being bonded together to form an integral structure.

4. A device to provide a heated resilient surface for a roll comprising an integral vulcanized sleeve structure of electrically conducting plastic composition, conductors attached to opposite ends of said sleeve so that said sleeve will generate heat substantially uniformly thereover when a difference of electrical potential is maintained between said conductors, a layer of electrically insulating composition interiorly lining said sleeve and a layer of electrically insulating resilient composition exteriorly covering said sleeve to provide a resilient contact surface, said sleeve adapted to be supported by a rigid core member when in use.

5. A device to provide a heated resilient surface for a roll comprising a sleeve of electrically conducting rubber, conductors attached to opposite ends of said sleeve so that said sleeve will generate heat substantially uniformly thereover when a difference of electrical potential is maintained between said conductors, a layer of electrically insulating plastic composition interiorly lining said sleeve and a layer of electrically insulating resilient plastic composition exteriorly covering said sleeve to provide a resilient contact surface, the electrical conducting rubber and electrical insulating compositions being vulcanized together to from an integral sleeve adapted to be supported in use by a rigid core member.

6. A roll having a resilient heated surface comprising a supporting core member and a body portion surrounding said core member, said body portion including an inner layer of electrically insulating composition adhered to said core member, a layer of electrically conductive rubber surrounding said insulating layer, a pair of spaced conductors attached to said conductive rubber, a pair of electric potential terminals mounted on and insulated from said core member, means connecting one of said terminals to one of said conductors and other said terminal to other said conductor, a source of electrical potential of different polarity connected to each terminal to cause said conductive rubber layer to generate heat substantially uniformly thereover and a layer of resilient electrically insulating plastic material covering said layer of conductive rubber, all of said layers being bonded together to form an integral structure.

7. A roll having a resilient heated surface comprising a supporting core member and a body portion surrounding said core member, said body portion including an inner layer of electrically insulating plastic composition adhered to said core member, a layer of electrically conductive rubber surrounding said insulating layer, a pair of spaced conductors attached to said conductive rubber, a pair of electric potential terminals mounted on and insulated from said core member, means connecting one of said terminals to one of said conductors and other said terminal to other said conductor, a source of electrical potential of different polarity connected to each terminal to cause said conductive rubber layer to generate heat substantially uniformly thereover, and a layer of resilient electrically insulating rubber material covering said layer of conductive rubber, all of said layers being bonded together to form an integral structure.

References Cited in the file of this patent

UNITED STATES PATENTS

| Number | Name | Date |
|---|---|---|
| 957,824 | Wade | May 10, 1910 |
| 1,433,674 | Carl | Oct. 31, 1922 |
| 1,596,181 | Hills | Aug. 17, 1926 |
| 2,011,748 | Boyd | Aug. 20, 1935 |
| 2,304,210 | Scott et al. | Dec. 8, 1942 |
| 2,489,643 | Hunter | Nov. 29, 1949 |
| 2,563,952 | Nichol | Aug. 14, 1951 |
| 2,591,383 | Spalding | Apr. 1, 1952 |
| 2,618,728 | Bram | Nov. 18, 1952 |

OTHER REFERENCES

"Heating and Ventilating," May 1948, page 64.